United States Patent
Geisen

(10) Patent No.: US 11,033,964 B2
(45) Date of Patent: Jun. 15, 2021

(54) METHOD OF PROVIDING AN ABRASIVE MEANS AND OF ADDITIVELY MANUFACTURING A COMPONENT

(71) Applicant: Siemens Aktiengesellschaft, Munich (DE)

(72) Inventor: Ole Geisen, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 276 days.

(21) Appl. No.: 16/302,651

(22) PCT Filed: Jun. 1, 2017

(86) PCT No.: PCT/EP2017/063246
§ 371 (c)(1),
(2) Date: Nov. 18, 2018

(87) PCT Pub. No.: WO2017/215922
PCT Pub. Date: Dec. 21, 2017

(65) Prior Publication Data
US 2019/0126351 A1    May 2, 2019

(30) Foreign Application Priority Data

Jun. 13, 2016   (EP) .................................. 16174166.5

(51) Int. Cl.
*B33Y 10/00*    (2015.01)
*B33Y 80/00*    (2015.01)
(Continued)

(52) U.S. Cl.
CPC .................. *B22F 3/24* (2013.01); *B22F 5/04* (2013.01); *B22F 5/10* (2013.01); *B22F 10/20* (2021.01);
(Continued)

(58) Field of Classification Search
None
See application file for complete search history.

(56) References Cited

U.S. PATENT DOCUMENTS 5,620,489 A   4/1997   Tselesin
6,335,097 B1   1/2002   Otsuka et al.
(Continued)

FOREIGN PATENT DOCUMENTS

CN   1145048 A      3/1997
DE   10007962 C1   7/2001
(Continued)

OTHER PUBLICATIONS

EP search report dated Jan. 10, 2017, for corresponding EP patent application No. 16174166.5.
(Continued)

*Primary Examiner* — Adam Krupicka

(57) ABSTRACT

A method of providing an abrasive structure for additive manufacturing includes determining of a design of a portion of a powdery base material and selectively solidifying the portion in a bed of the base material according to the determined design such that an abrasive structure is generated, wherein the abrasive structure is still movable in the bed of the base material. Further, an additively manufactured component has an internal surface with a surface roughness of less than 100 μm, preferably less than 60 μm.

12 Claims, 3 Drawing Sheets

(51) Int. Cl.
*B22F 3/24* (2006.01)
*B22F 5/10* (2006.01)
*B33Y 40/00* (2020.01)
*B29C 64/153* (2017.01)
*B29C 64/30* (2017.01)
*B22F 10/20* (2021.01)
*B22F 5/04* (2006.01)
*B22F 10/30* (2021.01)

(52) U.S. Cl.
CPC ............ *B29C 64/153* (2017.08); *B29C 64/30* (2017.08); *B33Y 10/00* (2014.12); *B33Y 40/00* (2014.12); *B33Y 80/00* (2014.12); *B22F 10/30* (2021.01); *B22F 2003/247* (2013.01); *B22F 2998/10* (2013.01); *B22F 2999/00* (2013.01); *Y02P 10/25* (2015.11)

(56) References Cited

U.S. PATENT DOCUMENTS 6,932,935 B1 8/2005 Oberhofer et al.
2014/0163717 A1 6/2014 Das et al.
2015/0336233 A1 11/2015 Twelves et al.
2015/0375359 A1 12/2015 Cui et al.
2016/0074940 A1 3/2016 Cote et al.
2016/0107288 A1 4/2016 Orilall et al.

FOREIGN PATENT DOCUMENTS

| EP | 2724799 A1 | 4/2014 |
| EP | 2910362 A1 | 8/2015 |
| JP | 2000073108 A | 3/2000 |
| JP | 2013194263 A | 9/2013 |
| JP | 5477739 B2 | 4/2014 |
| JP | 2016502603 A | 1/2016 |
| WO | 2016019434 A1 | 2/2016 |

OTHER PUBLICATIONS

International search report and written opinion dated Oct. 10, 2017, for PCT/EP2017/063246.

METHOD OF PROVIDING AN ABRASIVE MEANS AND OF ADDITIVELY MANUFACTURING A COMPONENT

CROSS REFERENCE TO RELATED APPLICATIONS

This application is the US National Stage of International Application No. PCT/EP2017/063246 filed Jun. 1, 2017, and claims the benefit thereof. The International Application claims the benefit of European Application No. EP16174166 filed Jun. 13, 2016. All of the applications are incorporated by reference herein in their entirety.

FIELD OF INVENTION

The present invention relates to a method of providing an abrasive means and for manufacturing a component from a base material, such as a powdery and/or granular base material, and a corresponding component.

The mentioned "component" may be any ceramic or metallic components or even a plastic component. Preferably, the component is or shall be applied in the flow path of turbo machines, such as gas turbines.

The term "additive" shall—in the present context—particularly denote a layer-wise, generative and/or bottom-up manufacturing process. The additive manufacturing as described herein advantageously relates to powder-bed manufacturing methods.

BACKGROUND OF INVENTION

Powder bed manufacturing techniques such as selective laser melting (SLM), electron beam melting (EBM) or selective laser sintering (SLS) are relatively well known methods for fabricating, prototyping or manufacturing parts or components from a bed of e.g. a powdery. Conventional apparatuses or setups for such methods usually comprise a build platform on which the component is built layer-by-layer after the feeding of a layer of the base material which may then be melted, e.g. by the energy of a laser beam and subsequently solidified. The layer thickness is determined by a wiper that moves over the powder bed and removes excess material. Typical layer thicknesses amount to 20 μm or 40 μm. During the manufacture, said laser beam scans over the surface and melts the base material in selected areas which may be predetermined by a CAD-file according to the geometry of the component to be manufactured.

A method of additive manufacturing is known from EP 2 910 362 A1, for example.

Usually, components produced or being producible via powder bed manufacturing techniques are limited with respect to surface properties, e.g. as compared to components manufactured by means of stock or investment casting. Particularly, additively manufactured components have inherently rougher surfaces and/or a poorer surface quality as compared to conventionally manufactured components. Rougher surfaces, however, can cause problems with respect to heat transfer, gas flows, or crack sensitivity during an intended operation of the respective component, e.g. as part of the flow path hardware of turbines. The mentioned drawbacks particularly relate to internal surfaces or surfaces which are not easily accessible, e.g. for post machining after the actual build up.

External surfaces of components manufactured additively can, on the other hand, be smoothened or machined in post-processing steps, such as conventional machining or grit blasting, whereas complex cavities or internal surfaces, such as, internal cooling channels or other surfaces are very difficult to refine for the given reasons. Efforts to smoothen or refine said internal surfaces often result in clogged holes or openings and thus failure to remove any refining media or excess base material from the corresponding cavity. Actually, there is almost no viable method for refining said internal surfaces and the mentioned disadvantages have to be accepted to a certain extend.

SUMMARY OF INVENTION

It is therefore an object of the present invention to provide means by which an improved additively manufactured component can be provided.

Particularly, a novel method is presented for providing an abrasive means, e.g. for machining, refining and/or processing an internal surface, e.g. of a cavity of a structure or component which is to be manufactured. Preferably, said manufacture describes an additive build up by SLM.

The mentioned object is achieved by the subject-matters of the independent claims. Advantageous embodiments are subject-matter of the dependent claims.

An aspect of the present invention relates to a method of providing an abrasive means, such as an abrasive structure, for additive manufacturing comprising determining of a design of a portion of a powdery or granular base material which is to be solidified for an additive manufacture. The determining may comprise determining the volume of the portion and/or the mass of the base material used for the portion.

The term "portion" may relate to any predetermined amount of base material which is to be solidified, e.g. either to be processed directly or indirectly, such as auxiliarily, for the respective component.

The determining may further comprise defining of a design or shape distribution, possibly comprising size information of the portion. Accordingly, the portion is not necessarily a continuous amount of base material. Instead, the portion may relate to different subportions of base material.

The method further comprises selectively, such as additively, solidifying the portion in a bed of the base material according to the determined design or shape such that an abrasive structure is generated, e.g. as an auxiliary means, wherein, however, the abrasive structure is still movable or remains movable in the bed of base material. In other words, the abrasive structure may be (loosely) retained in the material bed.

In an embodiment, the abrasive structure is not adhesively bonded or fixed to any further component or structure, nor to the build platform.

Said base material may particularly comprise a fine fraction, such as a fine powder, e.g. with an average particle diameter of e.g. few tens of micrometers and as well as a coarser granular fraction which may be formed from solidified and/or conglomerated powder particles.

The abrasive structure advantageously provides for a machining means for machining or processing surfaces of additively manufactured components.

In an embodiment, the selective solidification is carried out in that a scanning speed of a solidifying unit, such as a laser or electron beam unit e.g. of an according additive manufacturing system, is adjusted according to the determined design, dimension or morphology of the abrasive structure. Particularly, when choosing a reduced scanning speed, e.g. reduced in comparison to a conventional or usual scanning speed, a deep melt pool results by which the abrasive structure with the necessary dimensions may be generated.

In an embodiment, the selective solidification is carried out in that one or more further parameter(s) of additive manufacturing such as a laser power, is adjusted according to the desired dimension or morphology of the abrasive structure.

In an embodiment, the portion is solidified such that a plurality of clusters of solidified base material is formed for the abrasive structure and within the bed of base material. According to this embodiment, the abrasive structure may be rendered more effective, e.g. for a mechanical processing of an internal surface of the component to be manufactured.

A further aspect of the present invention relates to a method of additively manufacturing the component comprising additively assembling a structure for the component out of the bed such that the structure is provided with an internal surface and a part of the base material covers at least a part of the internal surface.

The method of additive manufacturing further comprises providing the abrasive structure as described above and actuating the abrasive structure such that the internal surface is mechanically processed and/or machined by the abrasive structure.

In an embodiment, the method of additively manufacturing comprises or relates to a surface machining or mechanical processing method.

Due to the mentioned actuation of the base material, said base material advantageously moves over or relative to the internal surface of the component such that the internal surface is processed. Said processing may relate to machining, grinding, refining, polishing, ablation or further or different frictional or abrasive treatment between the base material and the internal surface (or vice versa).

In an embodiment, the designing or determining is carried out by a computer algorithm and/or a computer aided algorithm (see below) such that the internal surface can advantageously effectively mechanically processed. Further, the mentioned determining and/or designing may be carried out with the aid of computer-aided manufacturing (CAM) and/or computer aided design (CAD) means. Moreover, simulation means may be conducted for the mentioned method steps. The mentioned choice of size, volume or shape of the clusters can particularly be chosen or calculated by a software-based method or software program, wherein, e.g. a threshold or maximum size of the clusters may be defined, e.g. via a preselected cluster volume.

The presented approach advantageously enables to carry out a novel machining method for mechanically processing and/or machining, such as abrasively machining internal surfaces of an additively assembled structure. The mentioned drawbacks caused by an inherent roughness of the solidified material of the as-manufactured structure or component can thus be overcome.

Particularly, surface roughness currently strongly affects oscillation stability of additively manufactured components in general, wherein particularly the depth roughness may be crucial.

An increase in the long-term (oscillation) stability of a majority of additively manufactured or prototyped parts may be achieved e.g. by improving surface roughness or smoothening, particularly of inner surfaces as these are not susceptible to post-machining. This aspect is particularly crucial due to the ever increasing importance of additively manufacturing, particularly in the fabrication of high-performance materials and components, such as thermally highly stressed turbine components. Thus, in order to ensure an acceptable thermal stability, rupture and creep stress susceptibility and product lifetime, there is the stringent need for an improvement of the surface properties in additive manufacturing.

Moreover, e.g. a cooling efficiency of turbine components can be significantly improved, as gas flows may be guided and/or improved due to the improved surface quality of internal passageways. Furthermore, there are no concerns of contamination of the component as the abrasive or machining medium is advantageously the same base material as the one out of which the component is manufactured anyway. This aspect is particularly crucial for the manufacture of superalloy components, such as nickel or cobalt-based superalloys of highest performance, wherein traces of contaminants may already destroy the necessary microstructure and/or material properties in terms of susceptibility to cracking, rupture or creep stress.

In an embodiment the structure is assembled such that the internal surface at least partly defines a cavity in which the base material is or can be retained. Accordingly, the base material is expediently in contact or communicating with the internal surface and/or the space.

In an embodiment, the abrasive structure is an abrasive blasting means, wherein, advantageously, a fluid or pressure blast is guided through an opening of the cavity, e.g. from an outside of the cavity, such that the internal surface is mechanically processed by the abrasive structure according to the present invention. According to this embodiment, the internal surface may be processed in an expedient way, particularly if the respective blast is guided from two opposing sides into the cavity.

In an embodiment, the abrasive structure is a vibratory abrasive means. E.g. the assembled structure may in this regard be actuated in a vibratory fashion, such as shaken, e.g. by a shaker or vibrator (cf. above). According to this embodiment, the (assembled) structure for the component, the abrasive structure and/or powdery base material, advantageously trapped inside the cavity, are actuated at a predefined frequency or frequency range.

The abrasive structure may be formed in that e.g. the base material is partly or locally solidified, e.g. with a laser beam of an additive manufacturing device by means of which the base material may be over-scanned for solidification, such that one or more, i.e. at least one, cluster(s) of solidified base material are formed within the bed of base material (cf. above).

In an embodiment, the cavity comprises at least one opening wherein, for the actuation of the base material, e.g. by means of abrasive blasting, such as grit blasting, a blasting fluid may be introduced into the cavity.

In an embodiment, the cavity comprises two openings, which may enhance the efficiency of processing of the internal surface by means of the mentioned abrasive blasting techniques.

In an embodiment, after the additive assembly, the cavity is at least partly sealed or closed, e.g. by a seal or closure. This may be performed by any suitable means known to a skilled person, such as a glue. Alternatively, only a porous structure may be sufficient for sealing the cavity. Thereby it is advantageous, that said seal can easily be released or removed after the actuation and that the closure or seal may easily be applied.

In an embodiment, the method comprises—after the actuation of the abrasive structure, e.g. at least partly, —opening or unsealing of the cavity such that the base material and/or the abrasive structure can at least partly be removed from the cavity, advantageously removed completely or almost completely.

In an embodiment, the structure either constitutes the component or the structure or its manufacture is completed to provide the component by further or additional additive buildup or assembly.

In an embodiment, the base material is at least partly, advantageously completely, removed from the cavity after the base material has been actuated.

In an embodiment, the component or an additive manufacture thereof is completed, expediently by means of an additive manufacturing technique such as selective laser melting.

In an embodiment, the component is completed, wherein e.g. the one or more cluster(s) are left or remain in the cavity, e.g. for damping dynamic loads, such as vibrations or oscillations, during an operation of the component. In this case, the component may be a rotating component such as a turbine component which is exposed to considerable mechanical or thermal dynamic loads or stresses in its intended operation.

In an embodiment, the base material is at least partly removed from the cavity and the one or more cluster(s) remain in the cavity e.g. for damping of said loads, during an operation of the component.

In an embodiment, the method comprises—after the additive assembly—and, expediently, prior to any closing of the cavity, introducing a machining fluid into the cavity. Said machining fluid may comprise any liquid or gaseous medium. Preferably, the machining fluid is or comprises a liquid which may comprise a further abrasive, apart from or besides the base material.

In an embodiment, the machining fluid is a fluid known in the field of ultrasonic machining.

In an embodiment, the method comprises applying ultrasound to the structure and/or the base material, e.g. during actuation.

A further aspect of the present invention relates to a component which is or can be provided or manufactured by the method, wherein the component comprises a machined or improved internal surface.

In an embodiment, a surface roughness of the internal surface of the readily manufactured or built component is less than 100 µm, advantageously less than 60 µm or even less. Such surface roughness denotes a range which is usually not achievable by conventional additive manufacturing techniques. Said surface roughness may denote a mean (surface) roughness, depth of roughness, a mean square roughness or a (arithmetical) mean roughness index.

In an embodiment, the internal surface of the readily manufactured component comprises surface features with a feature size of less than 100 µm, advantageously less than 80 µm. The mentioned features advantageously denote features of an intended and accordingly designed geometry, wherein said features may advantageously already be present in an according CAD and/or CAM model for the component.

Advantages relating to the described method of providing of an abrasive means and/or the method of additively manufacturing may as well pertain to the component and vice versa.

BRIEF DESCRIPTION OF THE DRAWINGS

Further features, expediencies and advantageous refinements become apparent from the following description of the exemplary embodiment in connection with the Figures.

FIG. 1 indicates a schematic sectional view of a setup of an assembled structure.

FIG. 2 indicates a schematic sectional view of an additively assembled component.

FIG. 3 indicates a schematic sectional view of the setup of FIG. 2, wherein an internal surface of the structure is being processed according to an embodiment of the present invention.

FIG. 4 indicates a schematic sectional view of the component wherein the internal surface is being processed according to another embodiment of the present invention.

DETAILED DESCRIPTION OF INVENTION

Figure 1:
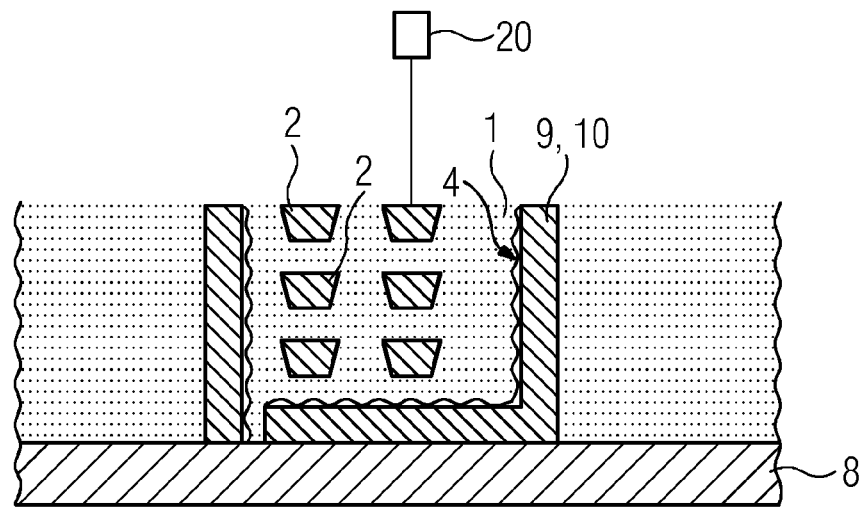
FIGS. 1 to 4 indicate different method steps of a method of providing an abrasive structure, e.g. for the machining of internal surfaces of additively manufactured components. Said method may be part of a novel additive manufacturing method.

Like elements, elements of the same kind and identically acting elements may be provided with the same reference numerals in the Figures.

FIG. 1 indicates a partly assembled structure 9 for a component 10. The structure 9 as well as the component 10 are advantageously manufactured by powder-bed based techniques. The structure 9 has advantageously been assembled out of the powder bed of base material 1 (see below).

An additive manufacturing method, as described herein advantageously relates to a selective laser melting or electron beam melting, wherein a powdery or granular base material 1 is (cf. numeral 1 below) is solidified layer-wise, e.g. by a laser or electron beam (not explicitly indicated in the Figures) in order to assemble the structure 9 for the component 10.

The component 10 is advantageously a component for an application in flow path hardware of turbo machines, such as gas turbine. The component 10 is advantageously manufactured from superalloys, such as nickel or cobalt-based superalloys for gas turbines. A powdery and/or granular base material 1 for the structure 9 may then be selected accordingly.

The structure 9 may constitute the component. Alternatively, the structure 9 may denote only a part of the whole or readily manufactured or assembled component 10. The structure 9 and the component 10 may be referenced synonymously.

In FIG. 1, a cavity 3 or space is shown defined by the additively assembled structure 9. The cavity 3 is at least partly filled with the base material 1, advantageously of powdery and/or granular structure. The structure 9 has advantageously been assembled out of the same base material, wherein the base material remaining in the cavity 3 may be an excess base material, advantageously remaining from the manufacture or assembly of the structure 9.

It is particularly shown in FIG. 1, that the structure 9 is assembled on a substrate 8, such as a base platform for the additive manufacture.

The structure 9 particularly constitutes a part of the component 10 which is to be manufactured. The structure 9 particularly comprises a base section adhered to the substrate 8 and two vertical wall sections (not explicitly indicated), wherein the structure is—or has been manufactured layer-wise in a plurality of different solidification steps.

The base section may be a root section of the turbine blade.

For solidification, a solidification unit 20 is shown which may comprise a laser or electron beam (cf. above). The structure is assembled such that the wall sections of the structure 9 defines or retains a powdery base material 1.

Further, it is shown in FIG. 1 that an abrasive means is provided inside of the structure 9, e.g. for mechanically processing or (abrasively) machining of an internal surface 4 of the structure 9. The abrasive means is advantageously an abrasive structure 2 comprising a plurality of clusters 7.

The clusters 7 are advantageously manufactured or assembled in that the powder bed of base material 1 is locally and/or partly solidified in an inside of the structure 9 (see below) and without being adhered to the structure 9 and/or the substrate 8.

The internal surface 4 is or comprises a certain (inherent) roughness as indicated by "zigg-zagged" or uneven morphology. Said morphology may be un-desired and inherently present to the respective additive manufacturing technique. Particularly the selective laser melting technique, though allowing for a plurality of advantages, usually only reveals a poor surface quality, which may at least be insufficient for internal cooling channels e.g. cooling channels for an application for turbine components, which can usually not be post-processed.

Prior to the actual forming or solidification of the clusters 7, the size and shape (distribution) of the clusters 7 have to be determined or tailored for the intended purpose. Particularly, a designing or determining is carried out by a computer algorithm and/or a computer aided algorithm such that the internal surface can advantageously effectively processed. Further, the mentioned determining and/or designing may be carried out with the aid of computer-aided manufacturing (CAM) and/or computer aided design (CAD) means. Moreover, simulation means may be conducted for the mentioned method steps. The mentioned choice of size, volume or shape of the clusters 7 can particularly be chosen or calculated by a software-based method or software program, wherein, e.g. a threshold or maximum size of the clusters may be defined, e.g. via a preselected cluster volume.

The method further comprises selectively, such as additively, solidifying the portion in a bed of the base material according to the determined design or shape such that an abrasive structure is generated, e.g. as an auxiliary means, wherein, however, the abrasive structure is still movable or remains movable in the bed of base material. In other words, the abrasive structure may be retained in the bed formed by the powdery base material.

Said clusters 7 are advantageously formed or formable in the powder bed, during the additive assembly of the component, wherein e.g. certain portions of the (powdery) base material are locally scanned over, e.g. with a conventional solidifying laser beam, wherein the manufacturing conditions are chosen such that no sintering or adhesion of the clusters occurs. For instance, the scanning speed may be lowered e.g. as compared to a conventional additive manufacturing of solidifying operations, such that a particularly deep melt pool results which allows for powder particles to conglomerate or solidify to the clusters 7.

Moreover, further parameters may be chosen and/or adjusted corresponding to the desired cluster geometry. Said parameter may be a beam profile of laser or electron beam, powder deposition rate, size and/or shape of exposed portion exposure or scanning speed, parameters of beam focusing, solidifying power (laser power) flow rate of inertial gas, layer thickness, melt pool thickness, parameters of scanning trajectory.

The clusters are, advantageously, freely movable in the bed or cavity. The size and/or shape of the clusters 7 may be chosen such that the internal surface 4 may be mechanically and/or abrasively processed or machined in order to refine the internal surface, when the base material 1 and/or the abrasive structure 2 are actuated (cf. FIGS. 3 and 4).

Actually, FIG. 1 shows exemplarily six clusters 7 which may be formed during the additive manufacturing process before the actual component is readily built up. Thus, said clusters 7 may be formed before, e.g. a cavity of the component 10 is completed.

Figure 2:
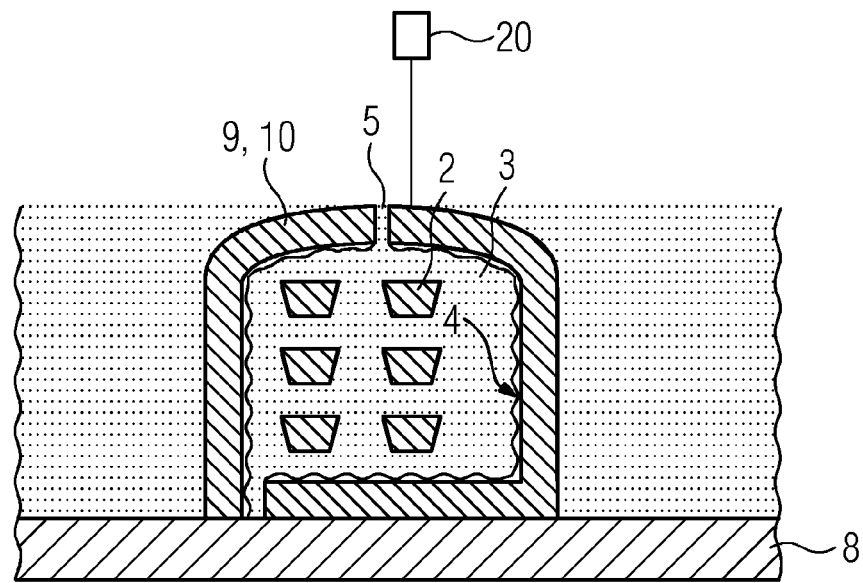

FIG. 2 shows the status of the manufacture, wherein advantageously the component 10 is completed and the component 10 comprises a cavity 3. By means of an opening 5, the cavity 3 may advantageously communicate with an outside of the component 10.

Accordingly, the component 10 is advantageously an at least partly hollow component of a gas turbine, such as a turbine airfoil, vane or blade, which is advantageously to be additively manufactured with the cavity 3, such as cooling channels for an efficient cooling of the component during an operation of the turbine.

The component 10 may be manufactured with a further opening 5, which may be revealed or opened after the substrate has e.g. been removed for the completion of the manufacture.

Figure 3:
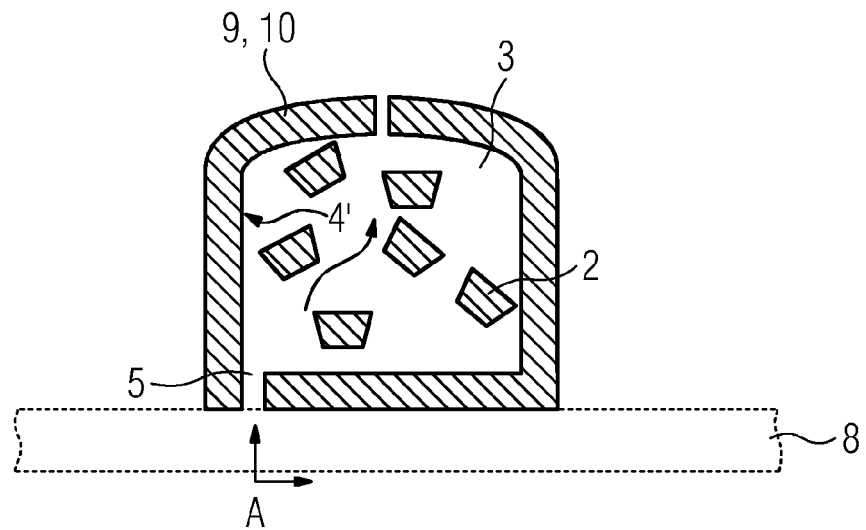

In FIG. 3 it is shown that, according to the present invention, the mentioned abrasive structure 2, advantageously constituted by the clusters 7 and possibly further powdery base material 1 is or has been used for the mechanical processing, such as abrasively machining of the internal surface 4.

The powdery base material 1 may also be used for the mentioned surface refinement, wherein this refinement may be less effective than the one performed by the clusters 7.

Preferably, the machining is performed predominantly by abrasion caused by the clusters 7. Thus, excess powdery base material may possibly be removed, such as sucked out, from the cavity prior to and according actuation of the clusters 7.

The mentioned actuation of the clusters 7 may be performed by a blasting abrasion and/or a vibratory abrasion, e.g. by means of shaking the substrate at e.g. with an actuated or vibrated substrate (cf. dashed contour lines and arrow A in FIG. 3), such as shaking table.

The mentioned actuation may be performed to achieve a material ablation for improving the roughness of the internal surface 4. However, said abrasion may also effect a polish, such that the surface is refined only with little abrasion effects.

For an expedient actuation, the mentioned opening 5 may has been closed or sealed by a closure 6. The closure 6 may be a seal, such as a glue or a porous material by means of which the cavity 3 is advantageously made powder-tight and/or closed such that base material 1 cannot escape from the cavity, even though the setup is flipped or an orientation thereof is varied. This may be performed by any means known to a skilled person. Preferably, the sealing is performed such that the closure 6 can easily be released afterwards, e.g. after the actuation of the abrasive structure.

FIG. 3 further indicates, as compared e.g. to FIGS. 1 and 2, that the "rough" internal surface has been mechanically processed and refined, such as abrasively grinded or polished, wherein the roughness or surface quality has been improved. Consequently, a particularly refined, even and/or improved internal surface 4' has been generated and/or provided which allows for an improved performance of the component in its intended operation, such as an improved cooling efficiency due to smoothened internal surface geometry.

The internal surface 4' of the readily manufactured component may—though not being indicated in the Figures—comprises surface features with a feature size of e.g. down to 100 µm or less, such as 80 µm or even less. The mentioned features advantageously denote features of an intended and accordingly designed geometry, wherein said features may advantageously already be present in an according CAD and/or see a model for the component. Said features may pertain to twirlers or tabulators, for example, wherein the tabulators may effect tabulation and thus an improvement of cooling efficiency in the readily manufactured turbine component.

Figure 4:
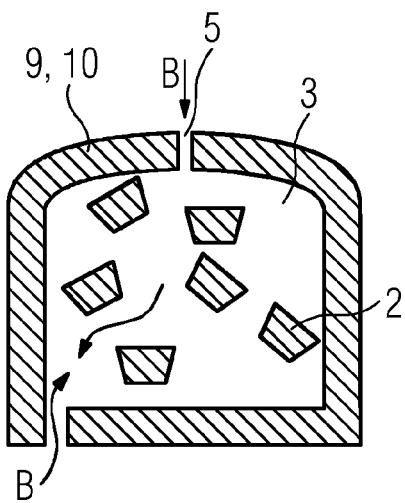

In FIG. 4 it is shown that the substrate 8 has been removed, e.g. by conventional means. Further, arrows B are shown, indicating that air or pressure blasts may be guided or introduced through the opening 5 into the cavity 3 such that the powder particles of the base material 2 as well as advantageously the clusters 7 of conglomerated powder are swirled around and thus facilitate the machining or abrasive processing of the internal surface 4 in an expedient way. Particularly, the blasts are guided into the cavity from two opposing sides of the structure 9, i.e. from the upper side and the lower side or from two opposing lateral sides.

According to the present invention, the method may comprise applying ultrasound to the structure and/or the base material, e.g. abrasive clustered structure, for the actuation.

In case that the described opening 5 of the cavity is not already facing upwards, such that the base material is trapped inside, the method may comprise changing the orientation of the setup such that the opening is directed upwards. In this case, the process step of sealing the opening 5 may be dispensed. Apart from the indication in the Figures, the structure 9 may be assembled such that, it comprises more than one opening, such as two or more openings, e.g. at opposing sides of the structure or at the top side thereof.

Therefore, the opening may be either widened or at least partly closed afterwards and/or the clusters may be smashed into smaller parts, for example.

Figure 5:
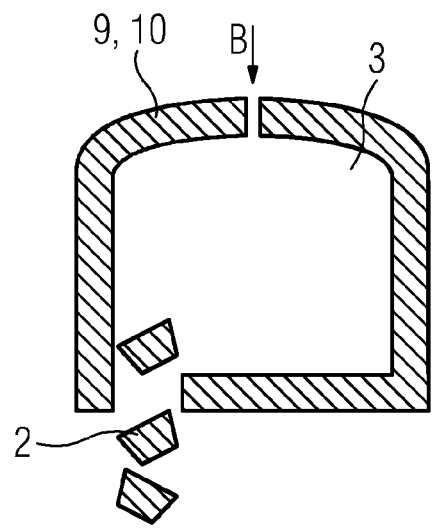
FIG. 5 indicates a schematic sectional view of the component, wherein an abrasive structure is being removed from a cavity of the component.

It is shown in FIG. 5 that the component 10 is completed built-up and/or manufactured, wherein the clusters 7 have been removed from the cavity, e.g. via an extension of the lower opening.

Although not indicated in the Figures, the described additive manufacturing method may describe further buildup or assembly steps after the base material—irrespective of the powdery, granular or clustered shape—has been used for the refinement of the internal surface 4, 4' and/or the base material 2 has been removed from the cavity 3.

Figure 6:
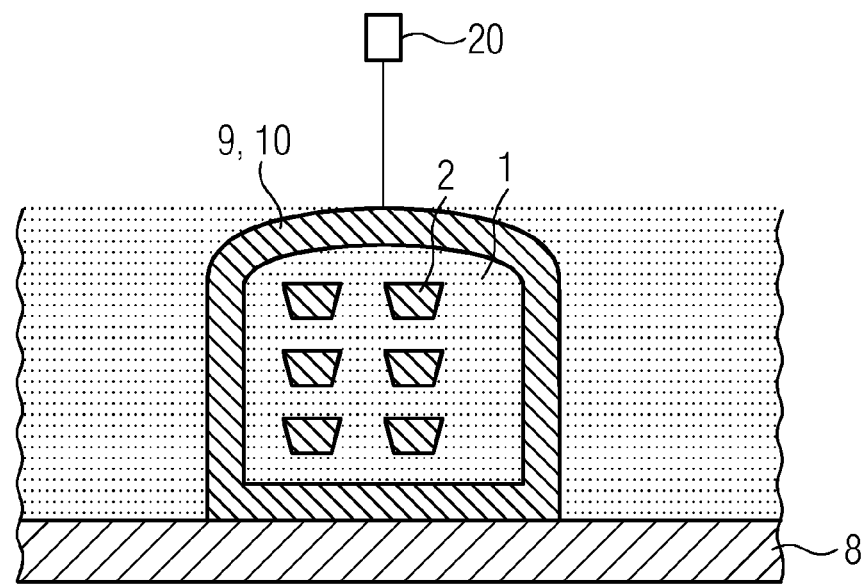
FIG. 6 indicates a schematic sectional view of an readily assembled component, wherein the abrasive structure remains in the cavity.

Apart from the indication in FIG. 5, the mentioned clusters 7 may remain in the cavity, e.g. for damping dynamic loads during an operation of the component 10, as shown in FIG. 6. In FIG. 6 it is further shown that the component has been readily manufactured, wherein, afterwards, the base material 1 may be removed and the abrasive structure 2 actuated, as described.

Alternatively, —along with the powdery base material 2—the clusters 7 may be removed, e.g. through the opening 5.

The revealed processed internal surface 4' is advantageously refined, improved or processed such that it provides a surface roughness or mean roughness index of less than 100 µm, advantageously less than 60 µm or even less. The component 10 and/or the structure 9 may—when treated by the presented refinement and/or manufacturing method, reveal a surface roughness or roughness depth of only 15 µm. This may particularly denote a surface quality which cannot be achieved by conventional additive manufacturing processes.

Moreover, the presented method allows for creating internal surfaces or cavities for the component 10 with surface features of an improved (structural) resolution or acuteness (cf. above).

Preferably, an additive manufacturing device (not explicitly indicated) is provided according to the present invention, wherein said device may comprise the apparatus 100. Said device may be a device for selective laser melting.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of additively manufacturing a component comprising:
    additively assembling a structure for the component out of the bed such that the structure is provided with an internal surface and the base material covers at least a part of the internal surface,
    providing the abrasive structure comprising determining of a design of a portion of a powdery base material and selectively solidifying the portion in a bed of the base material according to the determined design such that an abrasive structure is generated, wherein the abrasive structure is movable in the bed of the base material, and
    actuating the abrasive structure such that the internal surface is mechanically processed by the abrasive structure.

2. The method according to claim 1,
    wherein the selective solidification is carried out in that a scanning speed of a solidification unit, or a laser unit of an according additive manufacturing system, is adjusted according to the determined design of the abrasive structure.

3. The method according to claim 1,
    wherein the design of the portion is determined such that a plurality of clusters are formed for the abrasive structure within the bed of the base material.

4. The method according to claim 1,
    wherein a partly assembled structure or a component is assembled such that, an internal surface defines a cavity in which the abrasive structure is retained.

5. The method according to claim 4,
    wherein the abrasive structure is an abrasive blasting means and wherein a fluid or pressure blast is guided through an opening from an outside of the cavity such that the internal surface is mechanically processed by the abrasive structure.

6. The method according to claim 4,
    wherein after additive assembly, the cavity is sealed.

7. The method according to claim 4, further comprising, after actuation of the abrasive structure, opening of the cavity such that the base material and/or the abrasive structure at least partly is removeable from the cavity.

8. The method according to claim 4,
wherein the component is completed, and one or more cluster(s) remain in the cavity, allowing for damping dynamic loads during an operation of the component.

9. The method according to claim 1,
wherein the abrasive structure is a vibratory abrasive means.

10. The method according to claim 1,
wherein the determining of the design is carried out by a computer algorithm such that the internal surface is effectively mechanically processed.

11. The method according to claim 1, wherein the internal surface:
includes a surface roughness of less than 100 μm.

12. The method according to claim 11,
wherein the internal surface has a surface roughness of less than 60 μm.

\* \* \* \* \*